(12) United States Patent
Rose (10) Patent No.: US 6,449,278 B2
(45) Date of Patent: *Sep. 10, 2002

(54) EXCHANGE FOR COMMUNICATION NETWORK

(75) Inventor: Desne Jean Rose, St. Albans (GB)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/739,367

(22) Filed: Oct. 29, 1996

(51) Int. Cl.[7] .................................. H04L 12/56
(52) U.S. Cl. ...................... 370/397; 370/395.1
(58) Field of Search .................... 370/395, 397, 370/389, 351, 352, 353, 400, 401, 524, 522, 395.1, 465, 466, 354, 355, 356, 358, 360, 901, 902, 905, 904, 912, 347; 379/207, 220, 230, 207.11, 219, 220.01, 221.04, 221.12, 221.14, 225, 229, 231, 232

(56) References Cited

U.S. PATENT DOCUMENTS

| 5,029,165 A |   | 7/1991  | Choi ........................ 370/110.1 |
| 5,182,550 A |   | 1/1993  | Masuda et al. ........ 340/825.05 |
| 5,345,445 A |   | 9/1994  | Hiller ........................ 370/60.1 |
| 5,396,543 A | * | 3/1995  | Beeson et al. .............. 370/328 |
| 5,537,610 A | * | 7/1996  | Mauger et al. ............. 370/328 |
| 5,550,914 A |   | 8/1996  | Clarke ........................ 379/230 |
| 5,592,477 A | * | 1/1997  | Farris et al. ................ 370/396 |
| 5,592,530 A | * | 1/1997  | Brockman et al. .......... 370/250 |
| 5,978,464 A | * | 11/1999 | Sonnenberg ................ 379/220 |

FOREIGN PATENT DOCUMENTS

| CA | 2131234   | 3/1995  |
| GB | 2290433 A | 12/1995 |
| GB | 2291561 A | 1/1996  |
| GB | 2291562 A | 1/1996  |

OTHER PUBLICATIONS

Jabbari, "Routing and Conjestion Control in Common Channel Signaling System No. 7", Proceedings of IEEE, vol. 80, No. 4, Apr. 1992, pp. 607–617.

* cited by examiner

Primary Examiner—Dang Ton
(74) Attorney, Agent, or Firm—Lee, Mann, Smith, McWilliams, Sweeney & Ohlson (57) ABSTRACT

An exchange comprises a plurality of distributed nodes for processing calls from or to a first neighboring exchange, two or more of said nodes being arranged to be connected to the first neighboring exchange by separate trunk routes, and a signalling point code being assigned to the node-end of each trunk route, wherein the signalling point codes assigned to the node-ends of the separate trunk routes to the first neighboring exchange, differ from each other.

The first neighboring exchange sees the exchange as if it were two or more conventional exchanges. The total amount of call processing for handling a call in a network which incorporates one or more exchanges of the invention can be reduced.

10 Claims, 8 Drawing Sheets

EXCHANGE FOR COMMUNICATION NETWORK

FIELD OF THE INVENTION

The invention relates to telecommunication exchanges, methods of using such exchanges, switching systems for communication networks, methods of using such systems, and methods of routing traffic in networks.

BACKGROUND OF THE INVENTION

Figure 1:
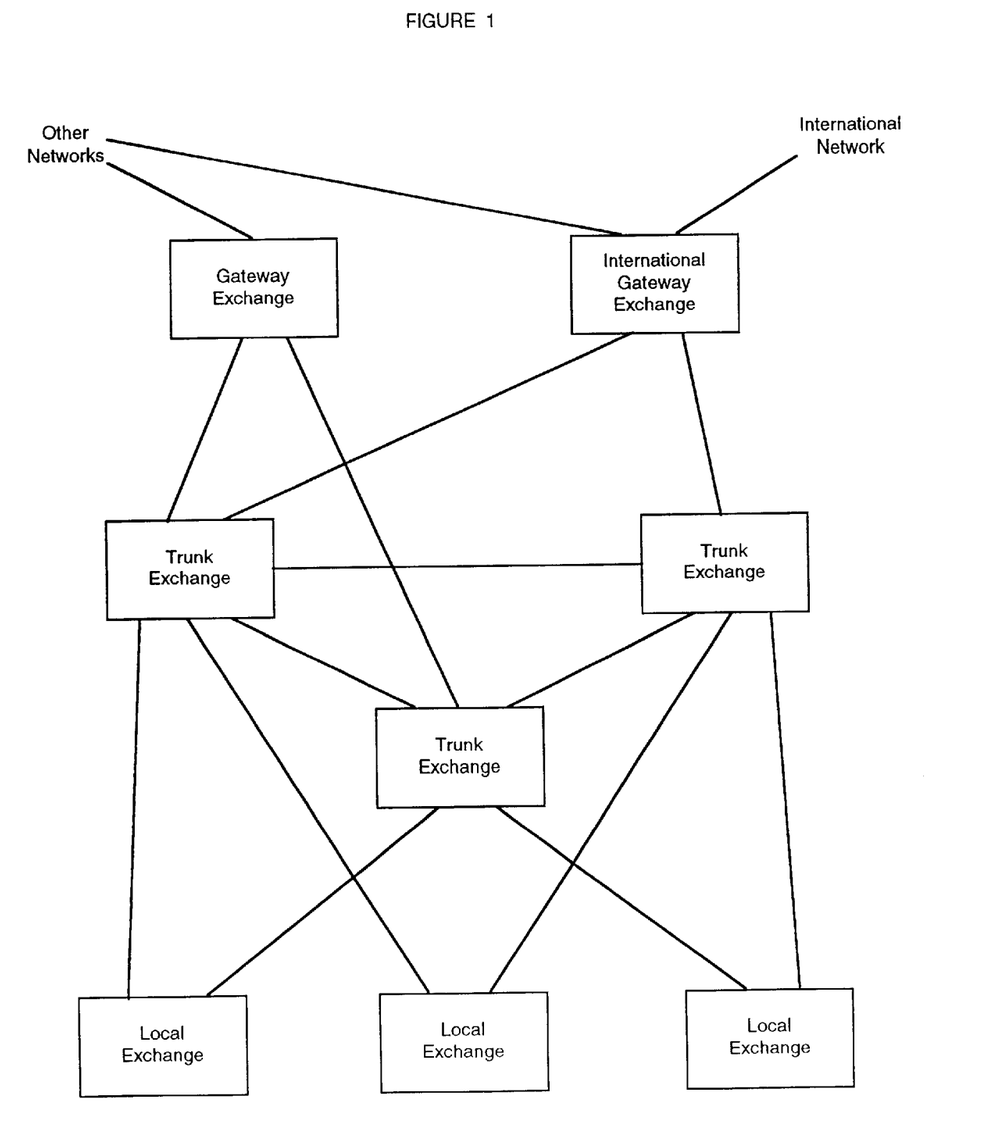
FIG. 1 shows a conventional network structure.

Known switched telecommunication networks, in general, consist of a hierarchical structure as shown in FIG. 1, and comprise some of the following set of elements:

local exchanges
  trunk exchanges
  gateway exchanges
  international exchanges
  trunk routes and trunk circuits Local exchanges are nodes in the network to which subscribers are connected. The low calling rates generated by subscribers are concentrated into streams of traffic which are routed onwards to trunk exchanges.

Trunk exchanges do not have subscribers connected to them. They operate on traffic which has been received from other exchanges and which has been pre-concentrated by the local exchanges.

Between any two exchanges (of any type), there exists a trunk route; each trunk route consists of a set of trunk circuits. Each trunk circuit, at any one time, carries the voice (or data) samples for one telephone call.

Trunk exchanges can act as either transit exchanges or tandem exchanges, depending upon their position in the network. It is also possible for an exchange to be a hybrid; for example, a local exchange can include some tandem functions. Occasionally, subscribers are connected directly to a trunk exchange; this can be in order to offer special services or for special reasons of topology or efficiency. The location and type of exchanges is a balance between transmission and switching costs, and the availability of sites.

Specialised trunk networks may also be employed to offer services where such services are not available on the main trunk exchanges or where significantly different calling patterns apply. A good example of such a specialised network is BT's Digital Derived Services Network which offers freephone 0800 and local rate 0345 services. Specialised networks are used when the traffic volumes make it difficult to justify the expense of upgrading the main trunk network or where service features are offered by a different vendor. However, the cost of switching through both trunk exchanges and specialised exchanges may be high if traffic starts to rise significantly. In some cases, the services will then be added in to the main trunk exchanges, and the specialised exchanges can be developed further or re-engineered to provide other services.

Figure 2:
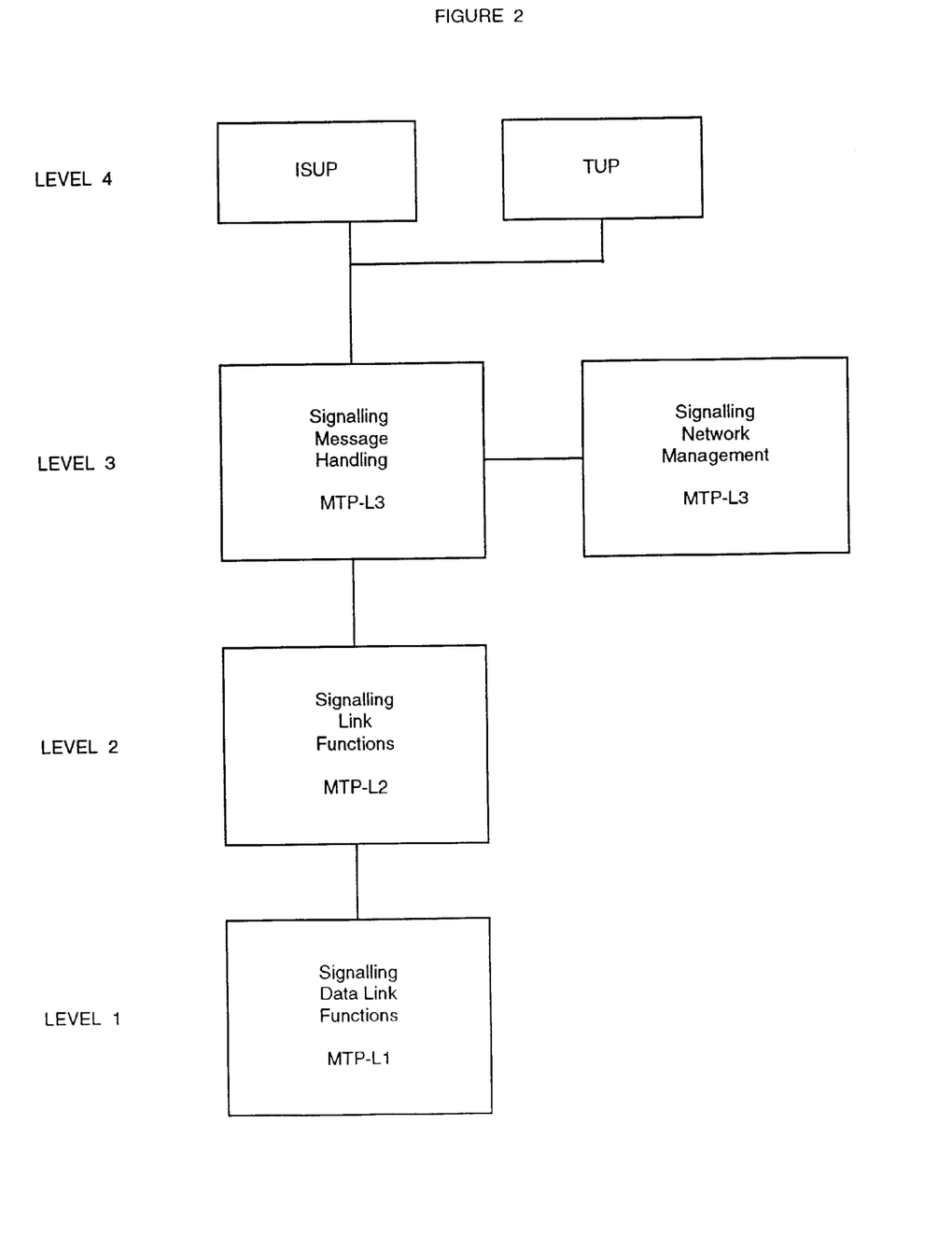
FIG. 2 shows conventional SS No.7 signalling functions.

Signalling System No.7 (SS No.7) is based upon ITU-T Recommendations Q701–706, Q721–725 and Q761–767. SS No.7 is designed for digital communication networks, including ISDN, which use stored program control exchanges. SS No.7 is optimised for 64 kbit/s bearers, however it can be used on 56 kbit/s bearers and can be operated at lower rates over analogue bearers (e.g. 4.8 kbit/s). It is currently widely used in the UK to set up and clear down telephone calls over 64 kbit/s trunk circuits between digital exchanges. SS No.7 is constructed on a modular basis. SS No.7 (in a narrowband environment) consists of a four-level hierarchy in two main parts: the message transfer part (MTP) which covers levels 1 to 3, and the application-dependent user part (e.g. telephone user part or ISDN user part) which is at level 4. FIG. 2 is a schematic of the overall SS No.7 structure in which the four levels correspond approximately to the first four levels of the well known seven-layer OSI model.

SS No.7 can also be used in a broadband environment. In such a situation, the broadband version of ISUP (commonly known as B-ISUP) would be used (based upon ITU-T Recommendations Q1761–1764) together with the same MTP-L3 as is used for narrowband. At the levels below MTP-L3, ATM would be used; with, for example, the ATM SAAL (based upon ITU-T Recommendations Q2100, etc.) being used instead of MTP-L2.

A brief summary pertaining to SS No.7 in a narrowband environment follows.

SS No.7 conveys information within signal units (SU), which are delimited by flags. There are three types of signal units, namely FISUs, LSSUs and MSUs. MSUs are the type of signal units which carry the signalling messages which are generated or handled by level 3, level 4 and above.

Level 1 (MTP-L1) defines the physical and functional characteristics of the signalling data link and the access to it. The signalling data link is a full duplex link which can operate over terrestrial or satellite channels. Normally a signalling data link is TS16 in the 32 time-slot 2048 kbit/s PCM system; however TS67–70 in the higher-order 8 Mbit/s multiplex can also be used; the signalling bit rate being 64 kbit/s in both cases. Lower rate signalling data links can also be used.

Level 2 (MTP-L2) carries out the signalling link functions. These include the adaptation between the processor's signal units and the continuous bit stream which is used over the signalling data link (including the insertion and removal of flags plus bit stuffing). Level 2 deals with alignment, with error detection and correction (using cyclic redundancy code $x^{16}+x^{12}+x^5+1$), and with the monitoring of the bit error rate. Where necessary, level 2 generates and receives LSSUs and FISUs. Level 2 transfers MSUs to and from level 3.

Level 3 (MTP-L3) carries out the signalling message handling functions; that is, it directs signalling messages to the correct signalling link or user part. Level 3 also carries out signalling network management functions; that is, it reconfigures signalling links after a failure or recovery, and generates and receives MTP-L3 network management signalling messages.

Level 4 is the user part; for example, it can be the TUP (telephone user part) or ISUP (ISDN user part).

All signal units (SU) include the following fields:

| | |
|---|---|
| F = | Flag (01111110) |
| CK = | Check bits |
| LI = | Length indicator |
| FIB = | Forward indicator bit |
| FSN = | Forward sequence number (this is achieved by incrementing the previous FSN by 1 in modulo 128) |
| BIB = | Backward indicator bit |
| BSN = | Backward sequence number |

In addition, MSUs include the following fields:

| | |
|---|---|
| SIO = | Service information octet |
| SIF = | Signalling information field. |

The service information octet and the signalling information field constitute the real contents of the signalling message as seen by the user parts and above. The service information octet identifies the type of user part. The signalling information field contains a routing label and the information content of the signalling message. The routing label includes the originating point code and the destination point code. (Note that the routing label for broadband SS No.7 is exactly the same as for narrowband SS No.7.)

The routing of messages such as MSUs, either for controlling telephone calls, for managing the signalling network, or for other purposes (e.g. accessing special services or data-bases), requires that the signalling points in the signalling network are given unique addresses. With SS No.7, these unique addresses are called point codes. In the SS No.7 signalling network, telephone exchanges are examples of signalling points.

The originating point code and the destination point code in a signalling message identify the sender and receiver of that signalling message. Thus this pair of point codes identify the signalling route set between the sending signalling point and the receiving signalling point. The signalling route set consists of all possible signalling paths between those two signalling points.

If the user part associated with the signalling message is the TUP or ISUP (or B-ISUP), then the pair of point codes within the signalling message identifies the sending exchange and the receiving exchange, and identifies the signalling route set between those two exchanges. This same pair of point codes also identifies the trunk route between those two exchanges (used by the telephone call with which the signalling message is associated).

In the situation where associated SS No.7 signalling is used, then the signalling route set between the sending exchange and the receiving exchange follows the same (direct) physical path as the trunk route.

In the situation where quasi-associated SS No.7 signalling is used, the signalling route set may follow a different physical path from the trunk route. In this case, the signalling route set will traverse one or more SS No.7 signalling transfer points. However, the signalling route set is still between the sending and the receiving exchange and there is still a one-to-one correspondence between the trunk route and its corresponding signalling route set. Note that, when quasi-associated signalling is used, it is possible to have a signalling network which is separate from the voice network.

A signalling link set is defined as the set of all the signalling links between two adjacent signalling points. In the case of associated SS No.7 signalling, the signalling route set between a sending exchange and a receiving exchange is carried via the signalling link set between those two exchanges. In the case of quasi-associated SS No.7 signalling, the signalling route set between the sending and receiving exchanges will be carried by a signalling link set between the sending exchange and the signalling transfer point and then carried by a (different) signalling link set between the signalling transfer point and the receiving exchange.

The allocation of these unique point codes to signalling points (e.g. telephone exchanges) is centrally controlled for each network on a country by country basis. A limited number of bits are available in the SS No.7 standards for defining point codes. Therefore unlimited expansion is not possible within the standards.

An exception to the rule of one point code per exchange occurs for international exchanges, which may have one point code in a country's national network and another in the international network. Similarly, gateway exchanges can have multiple point codes, each associated with a different network. When quasi-associated signalling is the norm in a network, there can exist gateway signalling transfer points, and such signalling transfer points can have multiple point codes; one particular example of this is described in U.S. Pat. No. 5,182,550 (Fujitsu).

In addition to the restriction concerning the total number of point codes which can be used within one network, there is a restriction concerning the number of trunk circuits which can belong to any one trunk route. This is because the SS No.7 signalling message field which is used to identify the trunk circuit within the trunk route is of a fixed size. When SS No.7 is used, each national trunk exchange is allocated one and only one point code. This means that there can be one and only one trunk route between any two neighbouring exchanges. The combination of these restrictions means that SS No.7 dictates the maximum number of trunk circuits which can be used between any two neighbouring exchanges.

A conventional architecture as shown in FIG. 1 uses SS No.7 for inter-exchange communication. Fairly complex call processing procedures are used as shown in schematic form in FIG. 3.

An exchange is defined as having a call switching function and call processing functions. The call processing functions are often split, so that they are associated with the incoming half and the outgoing half of the call. The exchange supports signalling systems such as SS No.7 at its boundaries for inter-exchange communication.

Figure 3:
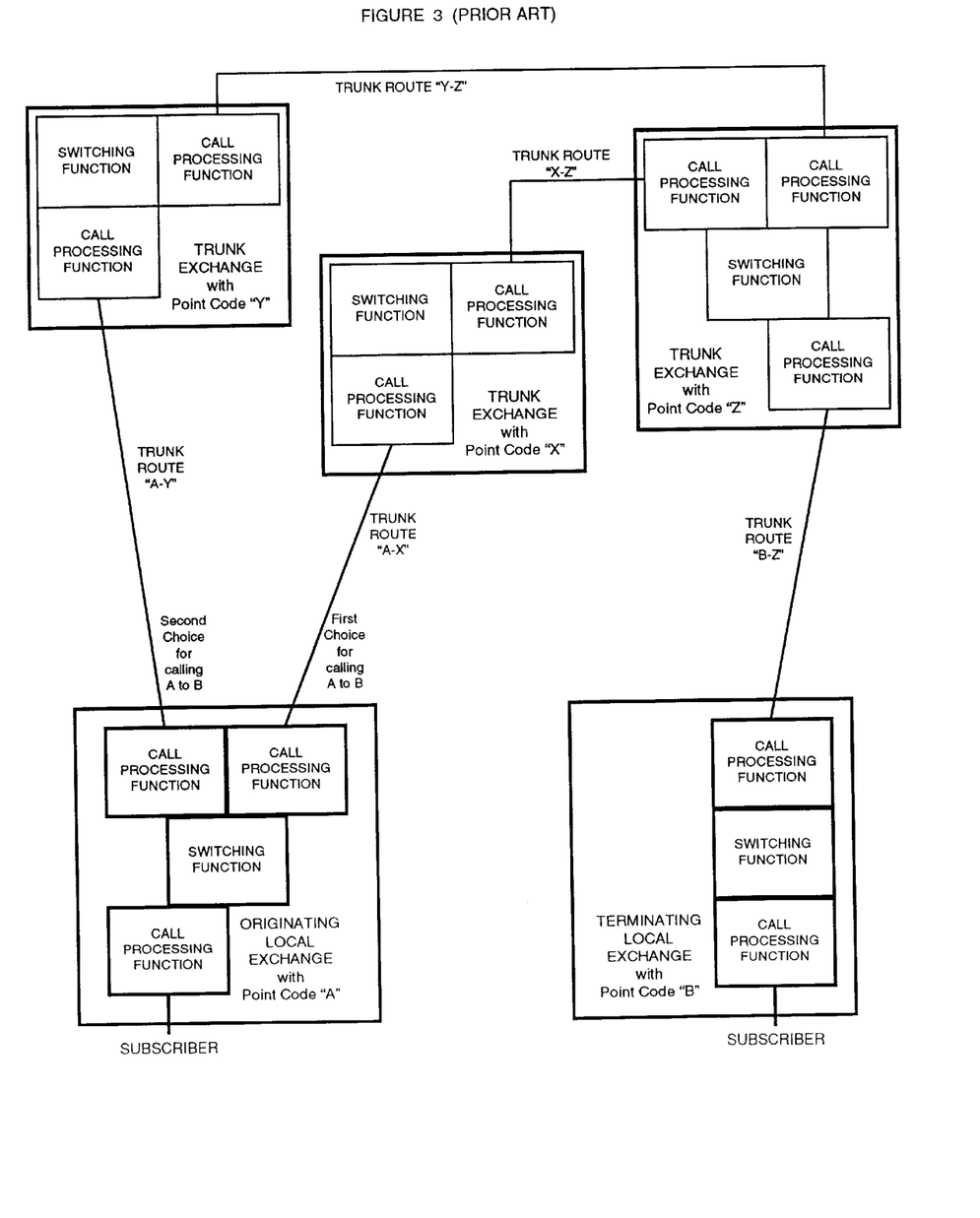
FIG. 3 shows call processing functions in a conventional network.

In FIG. 3, the local exchange having point code "A" sets up a call to the local exchange having point code "B", the call is routed via trunk exchanges "X" and "Z". An alternative route via trunk exchanges "Y" and "Z" is shown. Alternative routes are normally provided as a back-up in case the first choice route is congested or not available. However, two alternative routes with equal priority are quite often provided and the load is shared between them; this is for better resilience. The signalling paths are not shown in FIG. 3, for reasons of clarity.

In FIG. 3, the call processing functions are used to set up and supervise a call from "A" to "B" via exchanges "X" and "Z", or via exchanges "Y" and "Z". Although common channel signalling systems such as SS No.7 enable faster call set-up than earlier signalling systems, it is still fairly slow. SS No.7 requires considerable processing resources in each exchange, thus requiring the provision and maintenance of much hardware.

Where expansion of the overall capacity is required, more transit and tandem exchanges might be necessary. However, this increases the amount of processing required per call, which adds to the expense incurred.

SUMMARY OF THE INVENTION

The invention seeks to improve on known systems and methods.

According to a first aspect of the invention, there is provided an exchange comprising:
- a plurality of distributed nodes for processing calls from or to a first neighbouring exchange,
- two or more of said nodes being arranged to be connected to the first neighbouring exchange by respective trunk routes, and
- a point code being assigned to the node-end of each trunk route, wherein the point codes, which are assigned to the node-ends of the separate trunk routes to the first neighbouring exchange, differ from each other.

The exchange of the first aspect of the invention is one single exchange, albeit distributed and consisting of many nodes. From the perspective of neighbouring exchanges, it behaves like one exchange. It is also one exchange in signalling terms because a call can be passed between any pair of its nodes without using any type of inter-exchange signalling.

In the exchange of the invention, signalling point codes are allocated to the node-ends of the trunk routes. Point codes are not allocated to the nodes themselves; and point codes are not allocated to the exchange itself (as would be the situation for conventional exchanges). One node can support more than one signalling point code. The same point code can be allocated to more than one trunk route node-end (providing the trunk routes lead to different neighbouring exchanges).

If there are two or more trunk routes between the first neighbouring exchange and the exchange of the invention, then the first neighbouring exchange sees the exchange of the invention as being two or more exchanges. The first neighbouring exchange identifies each of these trunk routes via its own point code and the point code allocated to the node-end of the trunk route. Therefore the first neighbouring exchange views the other end of the said trunk route as being connected to an exchange which is identified by the point code allocated to the node-end of that trunk route.

The first neighbouring exchange has a choice of trunk routes to the exchange of the invention and, if desired, can allocate them equal priority and use load sharing.

Thus the exchange of the invention can be introduced into a network with a minimum of disruption. The neighbouring exchanges do not need any adaptation in order to be connected to the exchange of the invention.

The exchange of the invention can replace one or more existing exchanges. If it replaces two existing exchanges, and if the first neighbouring exchange was connected to each of the two replaced exchanges via a trunk route, then the first neighbouring exchange will be connected via two trunk routes to the exchange of the invention and will view the exchange of the invention as being two exchanges. No design, implementation or equipment changes will be needed in the first neighbouring exchange. All that will be required is that the first neighbouring exchange updates its data in order to alter the identities of the said two trunk routes.

The exchange of the invention can replace one existing exchange or many existing exchanges. The nodes in the exchange of the invention co-operate with each other and act as one exchange. Therefore when the exchange of the invention replaces several existing exchanges, the total amount of call processing and signalling activity is reduced.

Irrespective of how many existing exchanges the exchange of the invention replaces, the exchange of the invention can use as few as two point codes. The exchange of the invention can be expanded to any size (e.g. by adding more nodes), and still use as few as two point codes. The number of point codes required by the exchange of the invention does not depend upon the total number of nodes in the exchange. The number of point codes required by the exchange of the invention depends on the maximum number of trunk routes between the exchange of the invention and any one neighbouring exchange.

With normal exchanges, there can be one and only one trunk route between any two exchanges and thus there is a maximum number of trunk circuits which can exist between the two exchanges. If desired, there can be several trunk routes between the exchange of the invention and any neighbouring exchange; therefore there is no real restriction on the number of trunk circuits which can exist between the exchange of the invention and any one neighbouring exchange.

Because the exchange of the invention is expandable it can replace many existing exchanges. If this occurs, then because the exchange of the invention can use only a few point codes (normally only two), the number of point codes required by the network can actually be reduced in spite of a possible overall increase in traffic carrying capacity.

The distributed nature of the exchange of the invention means that its nodes are independently operable, and each node is able to continue working in spite of the presence of faults in other parts of the exchange. The nodes can be geographically distributed; this improves the resilience of the exchange to power supply failures and local problems affecting the building in which a node resides. More than one trunk route can be connected from a node to the same neighbouring exchange, providing the node-end of each trunk route is assigned a different point code. This is useful if capacity requirements warrant the use of more than one trunk route.

According to another aspect of the invention, there is provided a switching system for a communication network, the network also comprising a plurality of other devices inter-connected by routes, traffic being routed according to point codes assigned to points in the network, the switching system being connected to a first of said other devices by at least a first and a second of said routes, wherein the switching system comprises:

means for processing traffic on these two or more routes, wherein point codes are assigned to the switching system ends of each of these two or more routes, these point codes being mutually different.

According to another aspect of the invention, there is provided a method of routing traffic across a communication network, the network comprising a plurality of devices inter-connected by routes, point codes being assigned to identify an end of at least some of the routes in the network, wherein at least some of the point codes are re-used in such a manner that the routes are still uniquely identifiable by reference to the two or more point codes assigned to the ends of a respective route, wherein the method comprises the step of:

routing traffic across the network on the basis of the point codes.

According to another aspect of the invention, there is provided a method of routing traffic across a communication network, the network comprising a plurality of devices inter-connected by routes, codes being assigned to identify an end of at least some of the routes in the network, the method comprising the step of:

routing traffic to a subset of the devices in the network, wherein the ends of routes arriving at the subset of devices are identified by a set of two or more of said codes, none of which are re-used outside the subset, wherein at least some of the codes in the set are re-used in the subset, and wherein the step of routing traffic to the subset is carried out by routing the traffic to any of the set of codes.

Preferred features are set out in dependent claims. Preferred features may be combined as would be appreciated by a skilled person.

BRIEF DESCRIPTION OF THE DRAWINGS

The invention will now be described by way of example to show how it may be put into effect, with reference to the figures, in which.

DETAILED DESCRIPTION

Figure 4:
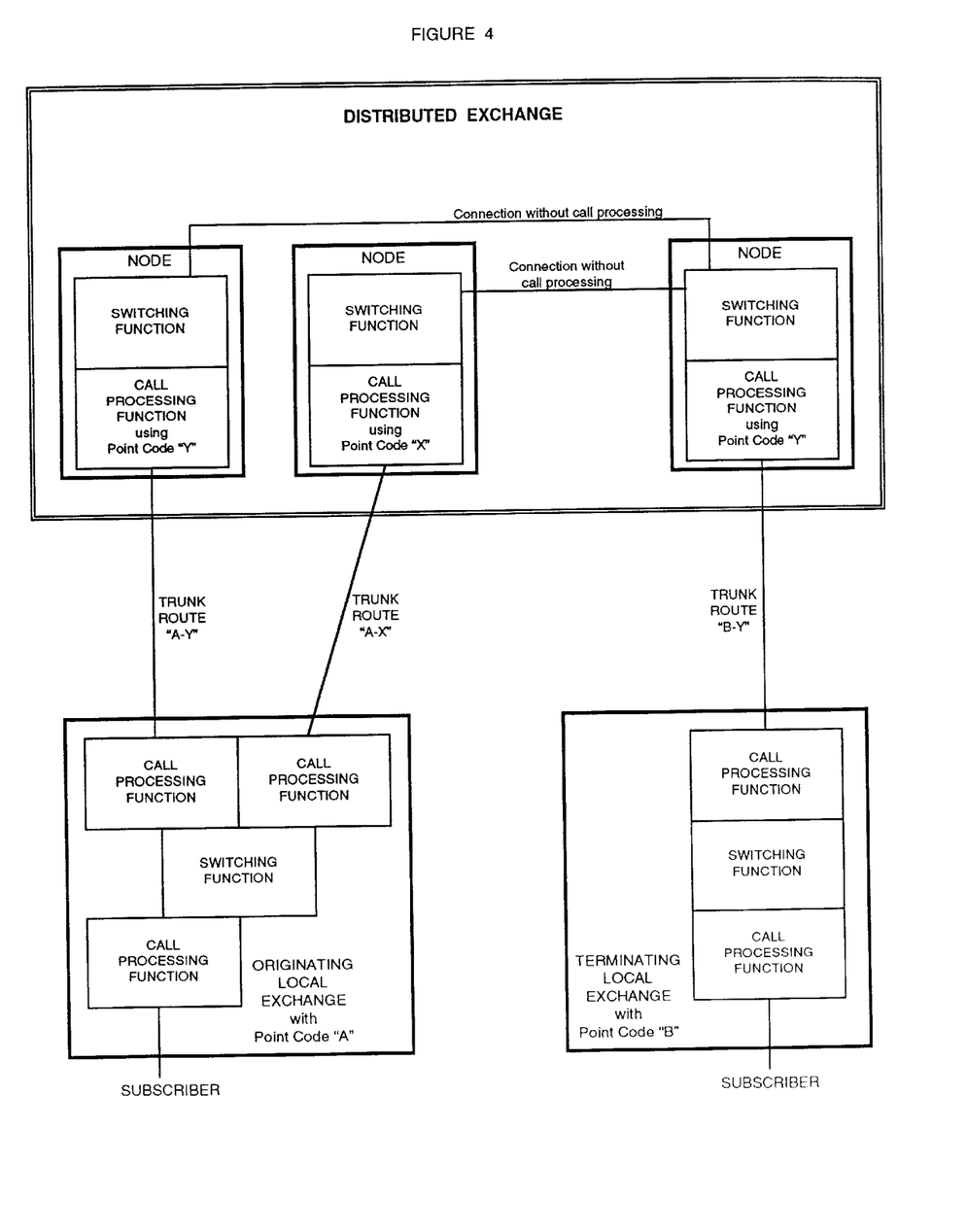
FIG. 4 shows functions in the exchange of an embodiment of the invention.

With reference to the first figure illustrating an embodiment of the invention, namely FIG. 4, an arrangement is depicted in the same manner as the known arrangement shown in FIG. 3.

The originating local exchange "A" sets up an outgoing call using trunk route "A-X". This trunk route leads to a node belonging to the exchange of the invention; for this trunk route, the node uses the point code "X". Both exchange "A" and the node use conventional call processing and conventional SS No.7 signalling for this stage of the call. As part of its call processing functions, the node performs conventional digit analysis and routing functions, and thus decides which trunk route, outgoing from the exchange of the invention, should be used for the next stage of the call.

Having selected an outgoing trunk route, the node determines from its data tables the node on which that trunk route resides. The selected outgoing trunk route could be on the same node or on a different node. FIG. 4 assumes that the selected outgoing trunk route, namely trunk route "B-Y", is on a different node. The node on which the incoming trunk route resided communicates with the node on which the selected outgoing trunk route resides. This inter-node communication does not use conventional call processing nor conventional inter-exchange signalling, instead it uses a fast efficient special-purpose method of communication.

The node on which the selected outgoing trunk route resides selects a free trunk circuit belonging to that trunk route.

The two nodes collaborate in order to set up a cross-office path, using the switching function, between the appropriate incoming trunk circuit belonging to the trunk route "A-X" and the selected outgoing trunk circuit belonging to trunk route "B-Y".

The node on which the selected outgoing trunk route resides now uses conventional call processing and conventional SS No.7 signalling to set up the call over the trunk route "B-Y" to exchange "B".

With this example as depicted in FIG. 4, exchange "A" thinks it is sending the call to exchange "X", and exchange "B" thinks it is receiving the call from exchange "Y". However, both exchange "A" and exchange "B" are actually dealing with the same exchange, namely the exchange of the invention.

Regarding the exchange of the invention, the selected outgoing trunk route could have been on the same node as the incoming trunk route; in this case the same node would have played both an incoming role and an outgoing role.

The selected outgoing trunk route could have had the same node-end point code value as the incoming trunk route, or a different node-end point code value; both cases would have worked equally well.

Figure 5:
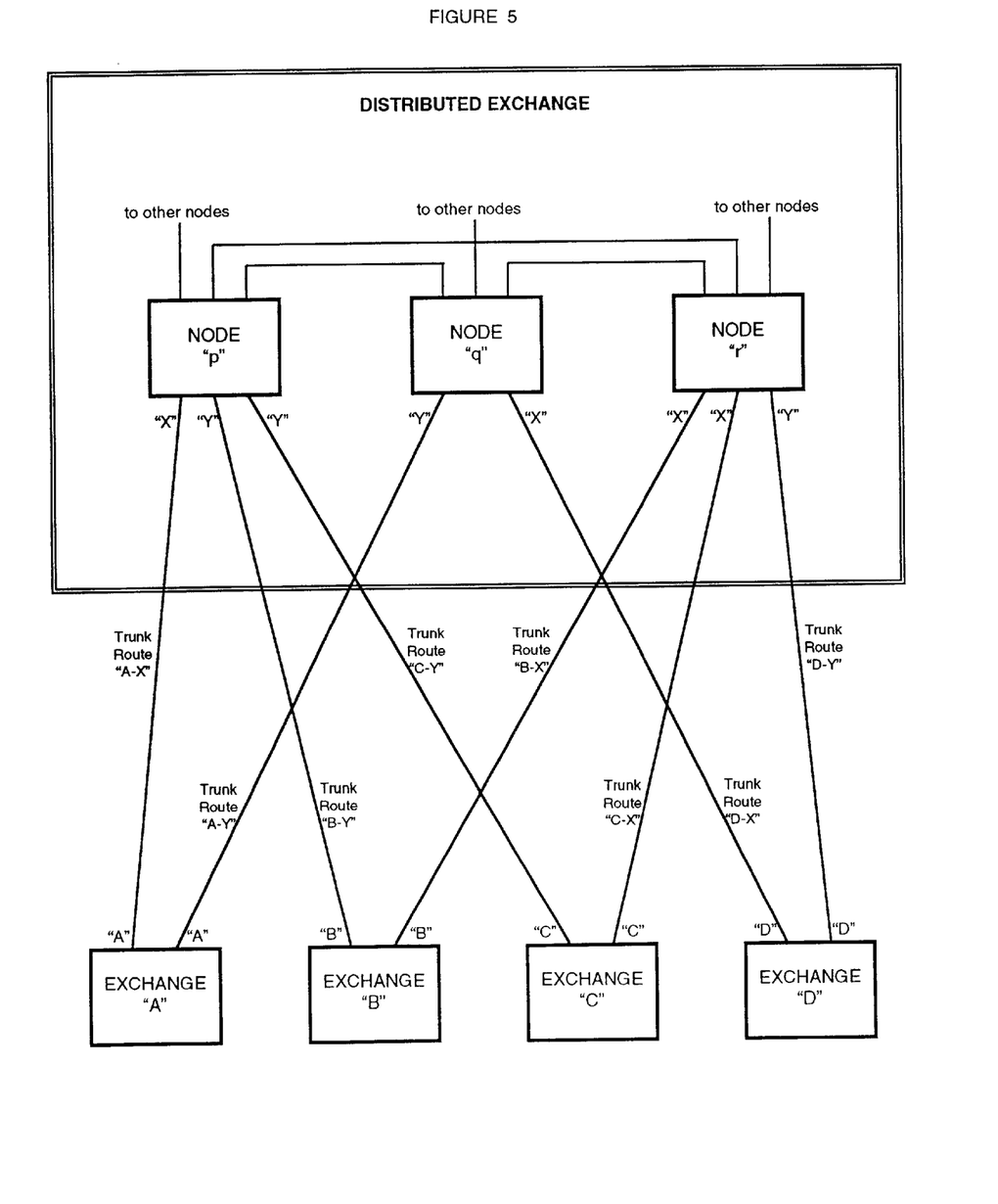
FIG. 5 shows parts of an embodiment of the invention.

FIG. 5 shows how the exchange of the invention can have many nodes and yet use as few as two point codes. FIG. 5 shows how the same pair of node-end point codes "X" and "Y" can be re-used. Each of the four neighbouring exchanges "A", "B", "C" and "D" thinks it is connected to an exchange "X" and to an exchange "Y". However, they are all connected to the same exchange of the invention; exchanges "A", "B" and "D" are each connected to a different pair of nodes; exchanges "B" and "C" are connected to the same pair of nodes.

A neighbouring exchange, "A" say, can choose whether to make the trunk routes "A-X" and "A-Y" have equal priority, or whether to make trunk route "A-X" be its first choice route and trunk route "A-Y" be its second choice alternative route. In the first case, exchange "A" would load share calls between the two trunk routes "A-X" and "A-Y". In the second case, exchange "A" would send all calls over trunk route "A-X" until that trunk route became congested or unavailable, and then it would send calls over trunk route "A-Y". This is exactly the same situation as if exchange "A" was connected to two conventional exchanges.

With SS No.7, when the associated mode of signalling is used, the signalling route set between any two exchanges uses a direct signalling link set between those two exchanges. Thus both the signalling route set and the signalling link set follow the same physical route as the trunk route.

Therefore, with the associated mode, all signalling messages will arrive in the same node (of the exchange of the invention) as the termination of the trunk route.

Since SS No.7 supports the quasi-associated mode of signalling, it is possible for the signalling messages belonging to a call to pass via a different physical route than that taken by the trunk route used by the call.

There are two situations where the quasi-associated mode of signalling might be used. Firstly, the associated mode of signalling is normally used, and the quasi-associated mode of signalling is used as a back-up if the signalling link set which is normally used becomes unavailable. This is the situation which typically could arise in the UK and most of Europe. With this arrangement, the quasi-associated mode typically makes use of signalling transfer point functions which are embedded within existing exchanges. Secondly, the quasi-associated mode of signalling is the norm, and the associated mode is rarely used. This is the situation which is typically used in the USA. With this arrangement, the quasi-associated mode typically uses stand-alone signalling transfer points, normally as mated-pairs (for resilience).

Figure 6:
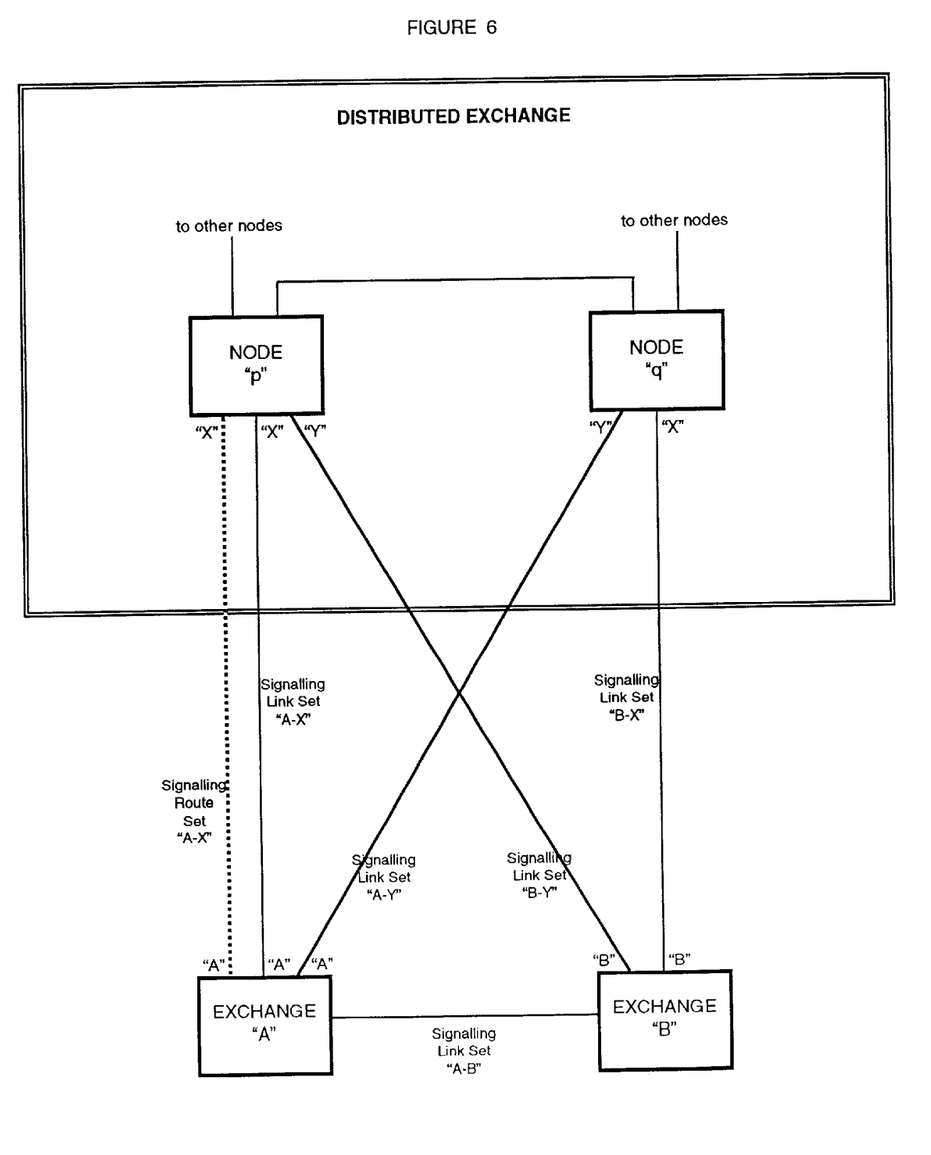
FIG. 6 shows parts of an embodiment of the invention.

FIG. 6 shows how the associated mode can be used as the norm with the quasi-associated mode being used as a back-up. The exchange "A" is making a call through the exchange of the invention using trunk route "A-X". So exchange "A" thinks it is communicating with exchange "X"; in actual fact it is communicating with the node "p" of the exchange of the invention. Therefore, for all signalling messages which it sends to what it thinks is exchange "X", exchange "A" will set the originating point code as "A" and the destination point code as "X". This means that the signalling route set to be used is "A-X". Because the associated mode of signalling is normally used, the signalling route set "A-X" will normally traverse just one signalling link set, namely the signalling link set "A-X", and will arrive in node "p". Suppose however, that for some reason or other (e.g. all its signalling links have failed), the signalling link set "A-X" has become unavailable. Then the signalling messages can be diverted via a signalling transfer point function embedded within exchange "B". In this situation, the originating point code and destination point code within the signalling messages are still "A" and "X" respectively. The SS No.7 MTP-L3 within exchange "A" will realise that the signalling link set "A-X" is unavailable, and will send the signalling messages down an alternative signalling link set, namely the signalling link set "A-B". When the SS No.7 MTP-L3 in exchange "B" receives such a signalling message, it will realise that the destination point code ("X") within the signalling message does not correspond to its own point code, so it will employ its embedded signalling transfer point function. The signalling transfer point function will recognise the destination point code "X" and will know that it has a signalling link set "B-X"; so it will send the signalling message down the signalling link set "B-X". This means that the signalling message will arrive in the exchange of the invention, but it will arrive in node "q". From the originating and destination point codes within the signalling message, the MTP-L3 in node "q" will realise that the signalling message belongs to the signalling route set "A-X". From its data tables, node "q" will determine where the node-end of signalling route set "A-X" resides (i.e. where the ISUP handling the signalling route set "A-X" resides), namely node "p". So the MTP-L3 in node "q" will send the signalling message to the ISUP in node "p" using the inter-node communication method. The same type of procedures would be taken for signalling messages which were destined for any other kind of user part.

Figure 7:
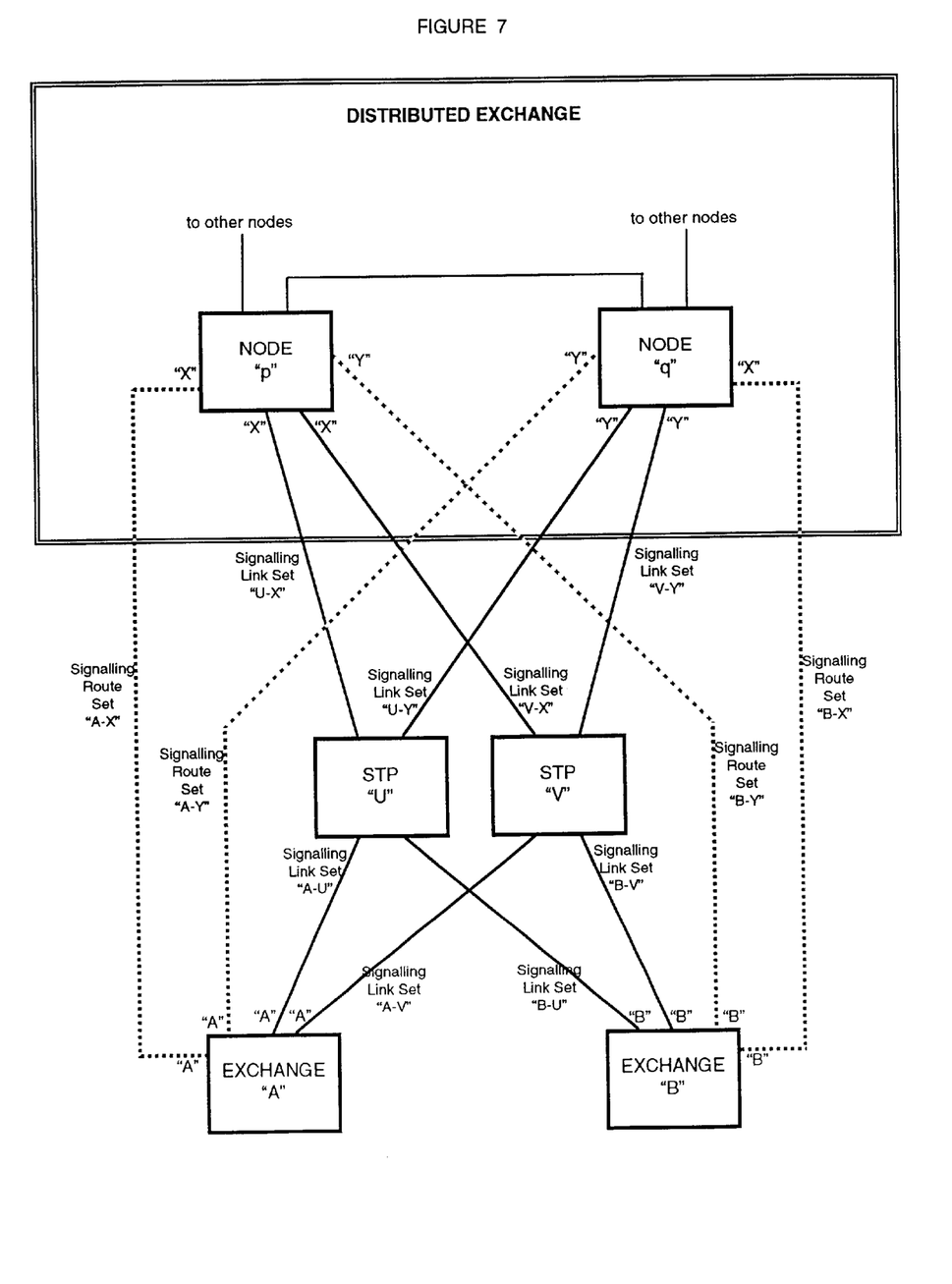
FIG. 7 shows parts of an embodiment of the invention.

FIG. 7 shows how the quasi-associated mode can be used as the norm, making use of mated pairs of stand-alone signalling transfer points. Stand-alone STPs are signalling points in their own right and need their own point codes (for management reasons, etc.). In this example, the mated pair of STPs have been given point codes "U" and "V".

When stand-alone STPs are supplied as mated pairs, there is normally one signalling link set between an exchange and each STP of the mated pair. The exchange will normally share its signalling load equally between these two signalling link sets, and thus each STP will carry on average half the total signalling load. In order to mimic the conventional arrangement regarding the two STPs of a mated pair and thus allow the STPs to think they are connected to a conventional exchange, each node belonging to the exchange of the invention will normally have a signalling link set to each STP of the mated pair and the node-end point codes of these two signalling link sets will normally be the same as each other.

With reference to FIG. 7, consider the case where exchange "A" is making a call through the exchange of the invention using trunk route "A-X". Exchange "A" thinks it is communicating with exchange "X"; in actual fact it is communicating with the node "p" of the exchange of the invention. Therefore, for all signalling messages which it sends to what it thinks is exchange "X", exchange "A" will set the originating point code as "A" and the destination point code as "X". Because the quasi-associated mode of signalling using a mated pair of stand-alone STPs is being used, the MTP-L3 in exchange "A" will select one of the stand-alone STPs, "U" say, and send the signalling message down the signalling link set "A-U". The STP "U" will read the destination code within the signalling message, namely "X", and will therefore send the signalling message down the signalling link set "U-X". Thus the signalling message will arrive in node "p", which is where the node-end of the signalling route set "A-X" and trunk route "A-X" resides.

Still with reference to FIG. 7, consider the situation where exchange "B" wishes to make a call through the exchange of the invention using trunk route "B-X". Exchange "B" will set the originating and destination point codes within the signalling messages to "B" and "X" respectively. In this situation, the node-end of trunk route "B-X" is in rode "q" and the node-end of the signalling route set "B-X" is in node "q". Because the quasi-associated mode of signalling using a mated pair of stand-alone STPs is being used, the MTP-L3 in exchange "B" will select one of the stand-alone STPs, "U" say, and send the signalling message down the signalling link set "B-U". The STP "U" will read the destination code within the signalling message, namely "X", and will therefore send the signalling message down the signalling link set "U-X". Thus the signalling message will arrive in node "p". From the originating and destination point codes within the signalling message, the MTP-L3 in node "p" will realise that the signalling message belongs to the signalling route set "B-X". From its data tables, node "p" will determine where the node-end of signalling route set "B-X" resides (i.e. where the ISUP handling the signalling route set "B-X" resides), namely node "q". So the MTP-L3 in node "p" will send the signalling message to the ISUP in node "q" using the inter-node communication method. The same type of procedures would be taken for signalling messages which were destined for any other kind of user part.

Signalling messages will be passed between various instances of MTP-L3, user parts and call processing modules, which might or might not reside in the same node (or processor) of the exchange of the invention as each other.

The nodes belonging to the exchange of the invention may be located locally to each other and may even be in the same building (e.g. if more than one node is installed purely for capacity reasons). However, it is anticipated that it will be advantageous, and hence more common, that the nodes will be located remotely from each other. This has advantages of resilience. It also allows the exchange of the invention to replace several existing exchanges and its distributed nodes to occupy some of the buildings where the replaced exchanges used to reside. This will reduce the amount of new trunk route cabling, etc., which will be required for the introduction of the new exchange of the invention.

Figure 8:
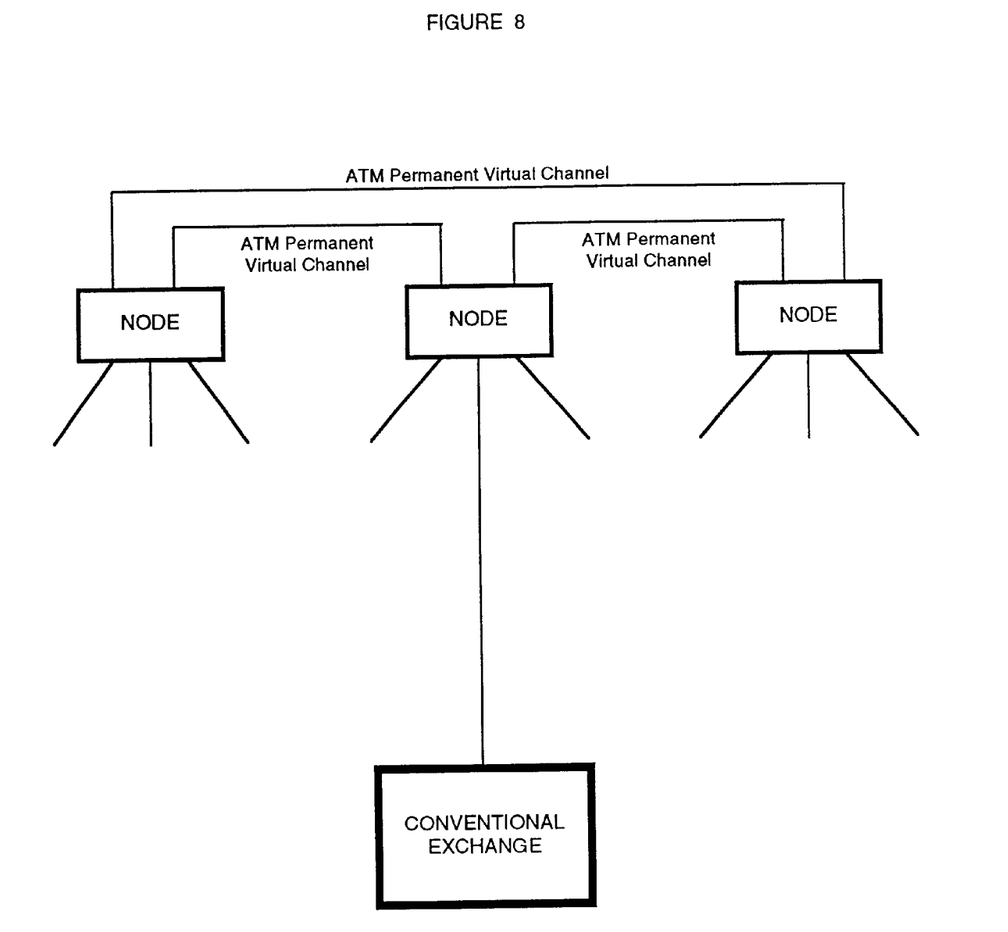
FIG. 8 shows parts of an embodiment of the invention.

Communication between the nodes belonging to the exchange of the invention may be implemented in various ways. FIG. 8 shows a means of communication between nodes which makes use of virtual channels in an ATM network.

In principle the ATM network could take over some or all of the switching function from the nodes, but there are advantages in using the ATM network in a cross-connect arrangement, without switching.

Narrowband calls can be carried on ATM permanent virtual channels across ATM networks incorporating cross-connects without there being any need to perform any conversions of the call between narrowband and broadband. This, together with the short delays incurred, can normally avoid any need to perform echo cancellation. It also avoids problems with loss of information which might occur when converting between narrowband and broadband.

Using an ATM network as the carrier for communication between the nodes of the exchange of the invention makes it easy to provide as much virtual capacity as needed. Permanent virtual channels can be set up across the ATM network from each node to every other node. There is no need for any broadband switching per call across the ATM network, and thus there is no need for any call processing functions to be associated with the ATM network.

The ATM network can be separately operated and effectively can be independent of the exchange of the invention. The use of permanent virtual channels to carry narrowband calls across an ATM network is described in co-pending applications, Nos. GB2291562 (Brueckheimer et al), GB2291561 (Brueckheimer et al), GB2290433 (Brueckheimer et al).

Furthermore, having a network which is capable of carrying broadband signals to all parts of the exchange of the invention enables easy incorporation of specialised broadband services by upgrading the nodes of the exchange. Thus broadband services could be offered to subscribers without major alterations to the structure of the exchange of the invention.

Although the embodiments illustrate the exchange of the invention as a trunk exchange, the exchange of the invention can easily be arranged to perform the functions of a local exchange, a gateway exchange or an international exchange, or to include the functions of any combination of such exchanges.

The exchange of the invention can also incorporate the functions of a service control point (SCP). A typical example of a SCP is a centralised processing function for handling specialised service features such as 0800 services. Conventionally such specialised services are not handled by the switching network, but by a separate SCP, for reasons of expediency and efficiency of installation, etc. However, this tends to lead to such calls being passed via more exchanges. Incorporating SCP functions within the exchange of the invention enables a reduction in the total number of exchanges such calls pass through, and thus a reduction in the total amount of call processing.

Although the embodiment described involves a telephone network using SS No.7 signalling, the invention is clearly applicable to any network, including computer networks, and to switching systems for such networks, where codes are allocated for use in routing traffic. It is also clearly applicable to networks using any other kind of signalling which requires signalling points to be allocated identification codes equivalent to SS No.7's point codes. Other variants will be apparent to a skilled man within the scope of the claims.

What is claimed is:

1. A communications exchange comprising:

a plurality of distributed nodes for processing calls from or to local exchanges, said nodes functioning as a single exchange for signaling purposes, two or more of said nodes each being arranged to be connected to selected ones of a plurality of local exchanges by respective trunk routes, and a signaling point code being assigned to a node-end of each trunk route, wherein the signalling point codes assigned to the node-ends of the separate trunk routes to each said local exchange differ from each other; wherein said point codes are re-used for the respective node ends of the trunk routes connecting to each said local exchange; and wherein communication between the distributed nodes of said communications exchange is effected without the use of inter-exchange signalling.

2. The exchange of claim 1 wherein the nodes are interconnected by a cross-connect arrangement.

3. The exchange of claim 1 wherein communication between nodes is carried out using asynchronous transfer mode.

4. The exchange of claim 3 wherein is narrowband signals are transmitting using asynchronous transfer mode between nodes, without conversion to broadband signals.

5. The exchange of claim 3 wherein permanent virtual channels are set up between the nodes.

6. The exchange of claim 1, comprising means for routing signalling messages to a given node, wherein the given node is identified by reference to the trunk route, or signalling route set, it serves.

7. A method of routing traffic across a communications network incorporating at least one distributed communications exchange comprising a plurality of distributed nodes for processing calls from or to a first neighbouring exchange, said nodes functioning as a single exchange for signaling purposes, two or more of said nodes each being arranged to be connected to selected ones of a plurality of local exchanges by respective trunk routes, and wherein communication between the distributed nodes of said communications exchange is effected without the use of inter-exchange signalling; wherein the method comprises:

assigning signalling point codes one to the node end of each trunk route such that the signalling point codes assigned to the node-ends of the separate trunk routes to each said local exchange differ from each other and such that said point codes are re-used for the respective node ends of the trunk routes connecting to each said local exchange; and routing traffic across the network on the basis of at least one of the re-used point codes.

8. The method of claim 7, wherein communication between nodes is carried out using Asynchronous Transfer Mode.

9. The method of claim 8, wherein narrowband signals are transmitted using Asynchronous Transfer Mode between nodes, without conversion to broadband signals.

10. the method of claim 8, wherein permanent virtual channels are set up between nodes.

* * * * *